Figure 1:
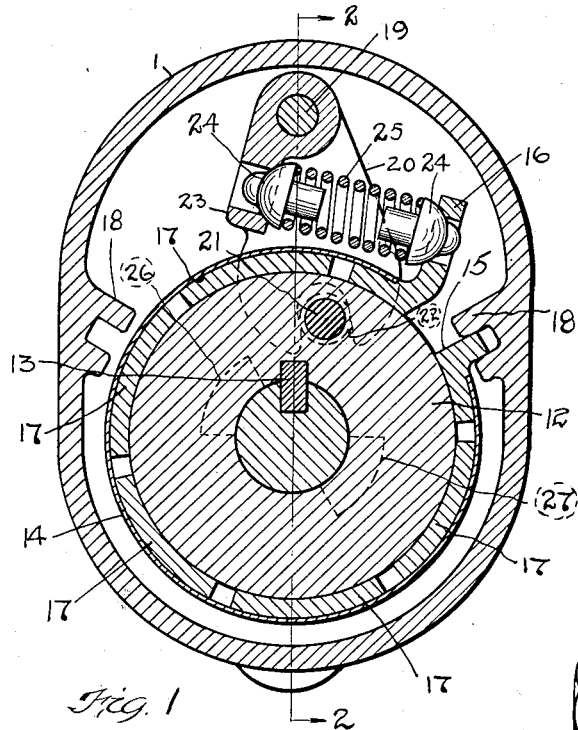

Dec. 18, 1934.    J. M. KELLER    1,985,034
SHOCK ABSORBER
Filed May 10, 1932

INVENTOR.
John M. Keller
BY
Fay, Oberlin & Fay
ATTORNEYS.

Patented Dec. 18, 1934

1,985,034

UNITED STATES PATENT OFFICE 1,985,034

SHOCK ABSORBER

John M. Keller, Lakewood, Ohio

Application May 10, 1932, Serial No. 610,418

8 Claims. (Cl. 188—130)

This invention relates as indicated to shock absorbers and has particular reference to the form of construction of apparatus commonly employed for the purpose of retarding or variously controlling the relative movement which occurs between parts of a vehicle such as the axle and frame as the wheels of the vehicle encounter inequalities in the road surface over which such vehicle is operated.

More particularly this invention relates to the so-called mechanical form of such shock compensator construction in contradistinction to the type of apparatus employing fluids under pressure, which when vented through restricted orifices, is relied upon to effect the proper dampening action.

The ideal action, generally stated, of a shock compensator for dampening the vibrations of the unsprung portion of the vehicle structure and to reduce to a minimum the transmission of such vibrations from the unsprung to the spring-supported portion of the vehicle may be briefly described as follows:

The types of inequalities in the road surface which is responsible for vertical vibration of parts of the vehicle may be divided into two main classes, i. e., obstructions which extend above the normal plane of the road surface and depressions which extend below such plane.

When the wheel of the vehicle encounters an obstruction in the road surface which forces the wheel upwardly and due to the relatively greater mass of the spring-supported weight of the vehicle, causes the wheel and the associated unsprung mass to deform the spring carrying the vehicle body, a shock compensator should permit, within limits, this deformation of the spring of the vehicle but should arrest or retard the rebound of the wheel so as to effectively dampen out undesirable oscillations and prevent the transmission thereof from the wheel to the body.

When encountering a depression in the plane of the road bed, however, the shock compensator, to efficiently perform the function for which it was designed, should retard the dropping of the wheel into such depression but permit the easy return thereof to again prevent the transmission of undue shock to the body of the vehicle.

In the past, these results have been sought after by the employment of complicated apparatus which is divisible into two main groups, i. e., first, that which employs a fluid which is forced through restricted orifices for the purpose of dissipating the potential energy stored up in the supporting springs of the vehicle and to accordingly dampen out vibrations and undue shock and second, those commonly referred to as mechanical means which employ various snubbing actions in an endeavor to accomplish the aforementioned desirable results.

The chief disadvantages of all types of apparatus previously employed may be briefly enumerated as the excessive cost of manufacture of such mechanism, the frailty of the operating parts reducing to a minimum the effective length of life of such apparatus and generally, the ineffectiveness of such apparatus to perform the function for which it has been designed.

It is among the objects of my invention to provide a shock compensator of the mechanical type which is capable of producing the desired results and what is more important, may be manufactured at an extremely low cost and is so simple in its construction that the attendant length of efficient operating life thereof of the apparatus is far beyond the normal requirements. Other objects of my invention will appear as the description proceeds.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 3:
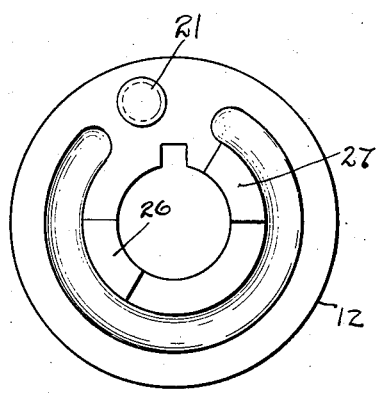
Figure 2:
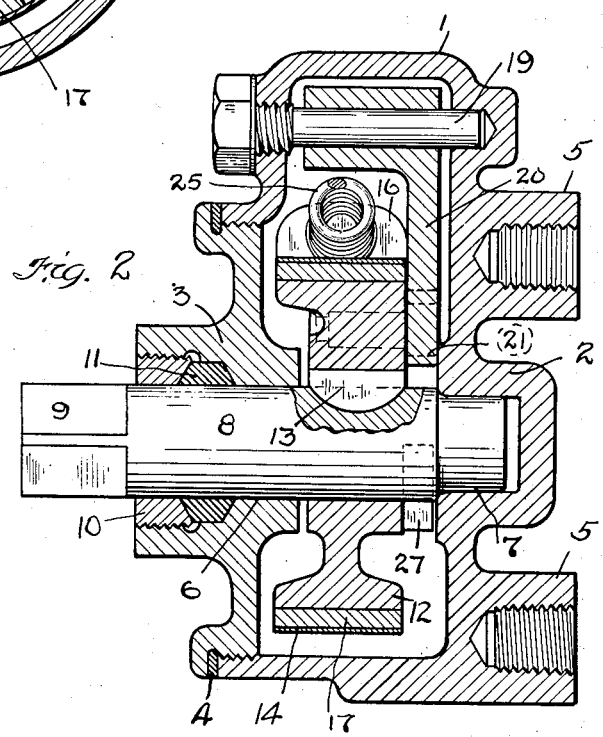
Figure 4:
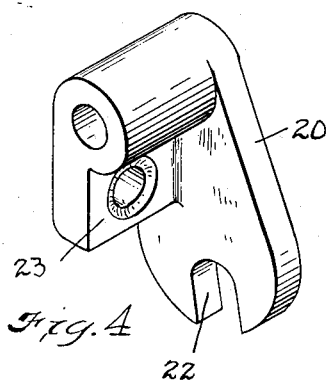

In said annexed drawing:

Fig. 1 is a transverse sectional view of the apparatus comprising my invention; Fig. 2 is a sectional view of the apparatus illustrated in Fig. 1 taken on a plane substantially indicated by the line 2—2; Fig. 3 is an end elevational view of the brake drum included as an element in the assembly illustrated in the previous figures; and Fig. 4 is a perspective view of the spring actuating means of such previously illustrated assembly.

Referring now more specifically to the drawing and more especially to Figures 1 and 2, the apparatus comprising my invention consists of a casing, generally indicated at 1, which is divided into two sections, generally indicated at 2 and 3, the latter being threaded into a suitably threaded wall on the forward face of the former and at the junction of such parts is provided a packing ring 4 for the purpose of providing a fluid-tight enclosure. The casing 1 is provided with internally threaded projections 5 by means of which the same may be rigidly secured to a portion of the vehicle such as the chassis frame. The casing 1 is provided with axially aligned bearing surfaces 6 and 7 which rotatably support a shaft 8 extending into the casing and terminally provided with a polygonal portion 9 adapted to be non-rotatably engaged by the end of a link connecting the shaft in such a manner to a part of the vehicle, such as the axle, so that when relative movement occurs between the spring-supported and unsprung portions of the vehicle, the shaft 8 will be rotated relatively to the casing 1. A suitable gland nut 10 and packing 11 is provided in the portion 3 of the casing around the shaft to prevent the escape of fluid from the casing at this point.

That portion of the shaft 8 within the casing 1 carries a brake drum 12 which may either be secured thereto by means of a key 13 or I may prefer to form the brake member and shaft integrally by forging or similar operation.

Encompassing the brake drum 12 is a brake band which has been illustrated for purposes of convenience as comprising a strap 14 which terminally has integrally formed shoes and bracket members 15 and 16 secured thereto and which intermediately of its ends has brake shoe members 17 secured thereto by some suitable means such as spot welding or the like.

At this point it may be well to note that I prefer to form this brake band by having the strap 14 of high-grade resilient steel and the shoes 17 of cast iron.

The inner periphery of the casing 1 is at diametrically opposite points provided with grooved abutments 18 into which extend and are secured against circumferential movement the end or ends, as the case may be, of the brake band.

The free end of the brake band is acted upon by resilient means, presently to be described, which maintains such band in intimate contact with the outer periphery of the drum 12 at all times, so that such brake structure is of the type commonly referred to as self-energizing.

Removably supported within the casing is a stub shaft 19 which, at its inner end, seats in a recess provided therefor in the rear surface of the inner wall of the casing 1 and at its forward end is threadably secured in a suitably formed aperture in the forward wall of the casing. Oscillatably supported on the shaft 19 is a lever, generally indicated at 20, and most clearly illustrated in Figure 4.

Carried by and projecting from the rear face of the brake drum 12 is a pin 21 which is engaged by the lever 20 in the slotted recess 22 formed in its lower end. The lug 23 and the outwardly projecting terminal 16 of the brake band are provided with coniform seats adapted to support the substantially semi-spherical terminals 24 of short pins which engage opposite ends of a compression spring 25.

Due to the fact that the various parts above described are assembled with the spring 25 normally in compression and further, due to the fact that upon extreme relative rotation between the brake drum 12 and the casing 1, the pin 21 may be caused to leave the slot 22 provided in the lower end of the lever 20, I provide abutments 26 and 27 on the rear face of the brake drum 12 to maintain the lever 20 in proper position relatively to the pin 21, so that as the drum is returned to its normal position, such pin may again properly enter the slot 22.

The operation of the above described form of apparatus is briefly as follows:

As above indicated, the casing 1 will be rigidly secured to a portion of the vehicle and suitable linkage will be provided whereby the shaft 8 is connected to another portion of the vehicle with which the first-named portion may have relative movement so that when such movement occurs, the shaft 8 and accordingly the brake drum 12 will be connected so that relative movement of the parts of the vehicle towards each other will cause a counterclockwise rotation of the drum 12 as viewed in Figure 1, assuming that the casing 1 is stationary, and when such vehicle parts are moved relatively away from each other, the drum 12 will rotate in a clockwise direction as viewed in Figure 1, assuming that the casing 1 is stationary.

As the wheel with which my shock absorber is associated passes over an obstruction in the roadway, thereby forcing the body and axle of the vehicle towards each other, the brake drum 12 will be rotated in a counterclockwise direction, as above indicated. This movement is relatively freely permitted to occur due to the well known characteristics of operation of this self-energizing type of brake employed. As the parts of the vehicle attempt to separate, however, i. e., as the wheel attempts to rebound, the brake drum, as viewed in Figure 1, will be rotated in a clockwise direction, whereupon the brake band will forcefully grip the drum due to the self-energizing characteristics of this brake, as well as due to the influence of the spring 25. Continued rotation of the brake drum 12 in a clockwise direction will effect a counterclockwise rotation of the lever 20 due to the connection therewith of the pin 21 of the brake drum. As the lever 20 is rotated in a counterclockwise direction, the spring 25 will be progressively compressed, thereby increasing the gripping effectiveness of the brake band on the drum. This progressive increase in the effectiveness of the retarding action of the shock absorber is the much sought after action and produces optimum results.

If the vehicle wheel encounters a depression in the road, the dropping of such wheel into such depression will, as above indicated, produce a clockwise rotation of the brake drum as viewed in Figure 1 and accordingly, the tendency of the wheel to drop into the depression is retarded by progressively increasing resistance produced by a progressive compression of the spring 25 reflecting in a corresponding increase in the pressure of the brake band on the drum but the movement of the wheel out of the depression is not retarded for the reason that the brake drum is moved in a counterclockwise direction.

As above indicated, the casing 1 will preferably be filled with some fluid, such as oil, which will render exceptionally smooth the above defined action of the shock absorber.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. In a shock compensator, the combination of a casing member, a brake drum arranged for movement relative to said casing, a brake band engaging said drum having one end engaged by said casing, resilient means engaging the other end of said band urging the same into engagement with said drum, whereby rotation of said drum in one direction is retarded while permitting relative freedom of movement in the opposite direction, and means for increasing and decreasing the force of said resilient means respectively during the aforesaid directions of rotation of said drum.

2. In a shock compensator, the combination of a casing member, a brake drum arranged for movement relative to said casing, a brake band engaging said drum having one end engaged by said casing, resilient means engaging the other end of said band urging the same into engagement with said drum whereby said relative movement in one direction is retarded while permitting the same with relative freedom in the opposite direction, and means functionally responsive to such relative movement for respectively increasing and decreasing the effectiveness of said resilient means during the aforesaid directions of relative movement.

3. In a shock compensator, the combination of a casing member, a brake drum arranged for movement relative to said casing, a brake band engaging said drum having one end engaged by said casing, resilient means engaging the other end of said band urging the same into engagement with said drum whereby said drum is effectively braked in only one direction of rotation, and means functionally responsive to such relative movement in the direction opposed by said brake for progressively increasing the effectiveness of said resilient means.

4. In a shock compensator, the combination of a casing member, a brake drum arranged for movement relative to said casing, a brake band engaging said drum having one end engaged by said casing, resilient means engaging the other end of said band urging the same into engagement with said drum whereby such relative movement is permitted to occur with relative freedom in one direction, and means functionally responsive to such relative movement in said direction for progressively decreasing the effectiveness of said resilient means.

5. In a shock absorber, a casing, a shaft rotatably supported in said casing and extending therefrom, a brake drum on said shaft within said casing, a self-energizing brake band on said drum supported at one end on said casing, a lever member oscillatably supported within said casing and actuated by rotation of said drum, and a spring between said lever and band whereby movement of the former varies the pressure of the latter on said drum.

6. In a shock absorber, a case, a shaft rotatably mounted therethrough and having an end projecting therefrom, a brake-drum fixedly mounted on said shaft, a brake-band encircling said brake-drum and having one end fixedly mounted in said case, a lever within said case oscillatably mounted on a pin through one end thereof, an element mounted on said brake-drum adapted to engage the free end of said lever and oscillate same responsive to movement of said brake drum, and a coil spring mounted between a seat on the free end of said brake-band and a seat on said lever intermediate said pin and said element, said spring being adapted to urge said brake-band into engagement with said brake drum.

7. In a shock absorber, a shaft rotatably mounted, a brake-drum fixedly mounted thereon, a brake-band encircling said brake-drum and having one end fixedly mounted adjacent thereto, a lever oscillatably mounted at one end, an element mounted on said brake-drum adapted to engage the free end of said lever and oscillate same responsive to movement of said brake-drum, and a coil spring mounted between a seat on the free end of said brake-band and a seat on said lever intermediate the ends thereof, said spring being adapted to urge said brake-band into engagement with said brake-drum.

8. In a shock absorber of the mechanical type employing a brake-drum with an anchored brake-band drawn thereabout, a lever oscillatably mounted by one end adjacent said drum, an element mounted on said drum adapted to engage the free end of said lever and oscillate same responsive to rotation of said drum, and a coil spring, mounted between the free end of said brake-drum and a point on said lever intermediate the ends and adapted to urge said brake-band into engagement with said brake drum.

JOHN M. KELLER.